(12) United States Patent
Negishi

(10) Patent No.: US 12,615,302 B2
(45) Date of Patent: Apr. 28, 2026

(54) INFORMATION PROCESSING APPARATUS, INFORMATION PROCESSING METHOD, INFORMATION PROCESSING PROGRAM, AND STORAGE MEDIUM

(71) Applicant: PIONEER CORPORATION, Tokyo (JP)

(72) Inventor: Hiroto Negishi, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 18/689,366

(22) PCT Filed: Dec. 28, 2021

(86) PCT No.: PCT/JP2021/048852
§ 371 (c)(1),
(2) Date: Mar. 5, 2024

(87) PCT Pub. No.: WO2023/127118
PCT Pub. Date: Jul. 6, 2023

(65) Prior Publication Data
US 2025/0007968 A1    Jan. 2, 2025

(51) Int. Cl.
*H04L 65/401* (2022.01)
*G01C 21/36* (2006.01)
(Continued)

(52) U.S. Cl.
CPC ...... *H04L 65/4015* (2013.01); *G01C 21/3688* (2013.01); *H04L 65/1069* (2013.01); *H04W 64/006* (2013.01)

(58) Field of Classification Search
CPC ............ H04L 65/4015; H04L 65/1069; G01C 21/3688; G01C 21/3647; G01C 21/26;
(Continued)

(56) References Cited

U.S. PATENT DOCUMENTS

2010/0114488 A1* 5/2010 Khamharn ............ G01S 5/0072
701/300
2017/0274771 A1* 9/2017 Sisbot ..................... G06T 11/60
(Continued)

FOREIGN PATENT DOCUMENTS

JP        H05-064124 A        3/1993
JP        2004-53323 A        2/2004
(Continued)

OTHER PUBLICATIONS

Japanese Patent Office, Office Action, Application No. 2023-570596, received Jun. 24, 2025, in 10 pages.
(Continued)

*Primary Examiner* — Alazar Tilahun
(74) *Attorney, Agent, or Firm* — Procopio, Cory, Hargreaves & Savitch LLP

(57)        ABSTRACT

Problem
The present invention has been made in consideration of the above-described points and an object of which is to provide an information processing apparatus that allows a user outside a vehicle, such as an automobile, to enjoy a virtual drive with a passenger riding the vehicle.
Solution
The information processing apparatus of the present invention includes: an acquisition unit that acquires current location information on a moving body and an outside image of the moving body shot by an image capturing unit disposed in the moving body while the moving body is traveling; a transmission unit that performs a transmission process of transmitting a traveling image to a terminal device, the traveling image including information based on the current location information superimposed on the outside image acquired by the acquisition unit; and a voice call unit that performs a voice call process in which a passenger of the (Continued)

moving body and a user of the terminal device perform a voice call simultaneously with the transmission process.

7 Claims, 8 Drawing Sheets

(51) Int. Cl.
H04L 65/1069 (2022.01)
H04W 64/00 (2009.01)
(58) Field of Classification Search
CPC ..... H04W 64/006; H04W 4/16; H04W 4/185; H04W 4/44; H04M 1/6075; H04M 1/72457; G08G 1/005; G08G 1/0112; G08G 1/0141; G08G 1/20
See application file for complete search history.

(56) References Cited

U.S. PATENT DOCUMENTS

| | | | |
|---|---|---|---|
| 2017/0307395 A1 | 10/2017 | Kim | |
| 2020/0184237 A1* | 6/2020 | Sakurada | H04W 4/38 |

FOREIGN PATENT DOCUMENTS

| | | |
|---|---|---|
| JP | 2007-074081 A | 3/2007 |
| JP | 2012-003408 A | 1/2012 |
| JP | 2016-102808 A | 6/2016 |
| JP | 2016-192598 A | 11/2016 |
| JP | 2016-213791 A | 12/2016 |
| JP | 2017-004388 A | 1/2017 |

OTHER PUBLICATIONS

Japanese Office Action received in corresponding JP Application No. 2023-570596, dated Dec. 3, 2024, in 7 pages, with translation.
European Patent Office, Extended European Search Report, Application No. 21969999.8, dated Apr. 4, 2025, in 21 pages.
"On Jun. 20, Saturday, with using WEB-Service "ZOOM", an ON-Line distribution for joying a feeling of boarding on an SL(Steam Locomotive)-TAIJU will be performed !", [online], Japan, TOBU Railway Co., LTD, Jun. 4, 2020, [Searched on Mar. 3, 2025] http://www.tobu.co.jp/cms-pdf/sl_topics/20200605131143giu7VWpWuYI_gmZNhRgrA.
Japanese Patent Office, Notice of Rejection, Application No. 2023-570596, dated Mar. 24, 2025, in 10 pages.
Han-San Branch. "Frontside Outlook of velocity meter in Rapid Express HIDA-11(KI-HA85) from Nagoya to Toyama, low image quality, Rear Side until GIHU" [on line], YouTube, United States, Google LLC, Jan. 19, 2021, [Searched on Mar. 3, 2025] https://www.youtube.com/watch?v=c6GfT4717k.
European Patent Office, Office Action, Application No. 21 969 999.8, dated Feb. 16, 2026, in 9 pages.
International Search Report (with translation) and Written Opinion received in corresponding International Application No. PCT/JP2021/048852, mailed Mar. 1, 2022, in 8 pages.

* cited by examiner

INFORMATION PROCESSING APPARATUS, INFORMATION PROCESSING METHOD, INFORMATION PROCESSING PROGRAM, AND STORAGE MEDIUM

CROSS-REFERENCE TO RELATED APPLICATIONS

This application is a US national stage application of International Application PCT/JP2021/048852, filed Dec. 28, 2021, the contents of which are incorporated by reference.

TECHNICAL FIELD

The present invention relates to an information processing apparatus, an information processing method, an information processing program, and a storage medium. For example, the present invention relates to an information processing apparatus, an information processing method, an information processing program, and a storage medium for performing communication between a moving body and outside thereof.

BACKGROUND ART

There is a communication system for performing communication between an on-vehicle machine mounted on a vehicle and an off-vehicle terminal located outside the vehicle. For example, Patent Document 1 discloses a system in which a voice call is performed between a driver of a vehicle and an operator of an off-vehicle terminal, and when the voice call is performed, video data representing a video of the front of the vehicle is transmitted from an on-vehicle machine to the off-vehicle terminal to display the video on the off-vehicle terminal.

Patent Document 1: JP-A-2016-213791

DISCLOSURE OF THE INVENTION

Problems to be Solved by the Invention

A system such as Patent Document 1 is intended to deal with the driver looking aside, and therefore carries one problem that a user of the off-vehicle terminal cannot feel like riding on the vehicle and enjoy the drive with the driver of the vehicle.

The present invention has been made in consideration of the above-described points and an object of which is to provide an information processing apparatus that allows a user outside a vehicle, such as an automobile, to enjoy a virtual drive with a passenger riding the vehicle.

Solutions to the Problems

An invention according to claim 1 is an information processing apparatus including: an acquisition unit that acquires current location information on a moving body and an outside image of the moving body shot by an image capturing unit disposed in the moving body while the moving body is traveling; a transmission unit that performs a transmission process of transmitting traveling image information to a terminal device, the information on the traveling image including information based on the current location information superimposed on the outside image acquired by the acquisition unit; and a voice call unit that performs a voice call connection in which a passenger of the moving body and a user of the terminal device perform a voice call simultaneously with the transmission process.

An invention according to claim 4 is an information processing apparatus including: an acquisition unit that acquires current location information on a moving body, route information related to a planned travel route of the moving body, and an outside image of the moving body shot by an image capturing unit disposed in the moving body while the moving body is traveling; a transmission unit that performs a transmission process of transmitting the outside image and the route information acquired by the acquisition unit; and a voice call unit that performs a voice call process in which a passenger of the moving body and a user of the terminal device perform a voice call simultaneously with the transmission process.

An invention according to claim 5 is an information processing method executed by an information processing apparatus that moves together with a moving body. The information processing method includes: an acquiring step of acquiring current location information on the moving body and an outside image of the moving body shot by an image capturing unit disposed in the moving body while the moving body is traveling; a transmitting step of performing a transmission process of transmitting a traveling image to a terminal device, the traveling image including information based on the current location information superimposed on the outside image acquired in the acquiring step; and a voice call step of performing a voice call process in which a passenger of the moving body and a user of the terminal device perform a voice call simultaneously with the transmission process.

An invention according to claim 6 is an information processing program for causing an information processing apparatus that moves together with a moving body to execute: an acquiring step of acquiring current location information on the moving body and an outside image of the moving body shot by an image capturing unit disposed in the moving body while the moving body is traveling; a transmitting step of performing a transmission process of transmitting a traveling image to a terminal device, the traveling image including information based on the current location information superimposed on the outside image acquired in the acquiring step; and a voice call step of performing a voice call process in which a passenger of the moving body and a user of the terminal device perform a voice call simultaneously with the transmission process.

DESCRIPTION OF PREFERRED EMBODIMENTS

Embodiment 1

[1. Configuration of System]

The following describes a virtual ride-along communication system 100 as Embodiment 1 of the present invention with reference to the attached drawings.

Figure 1:
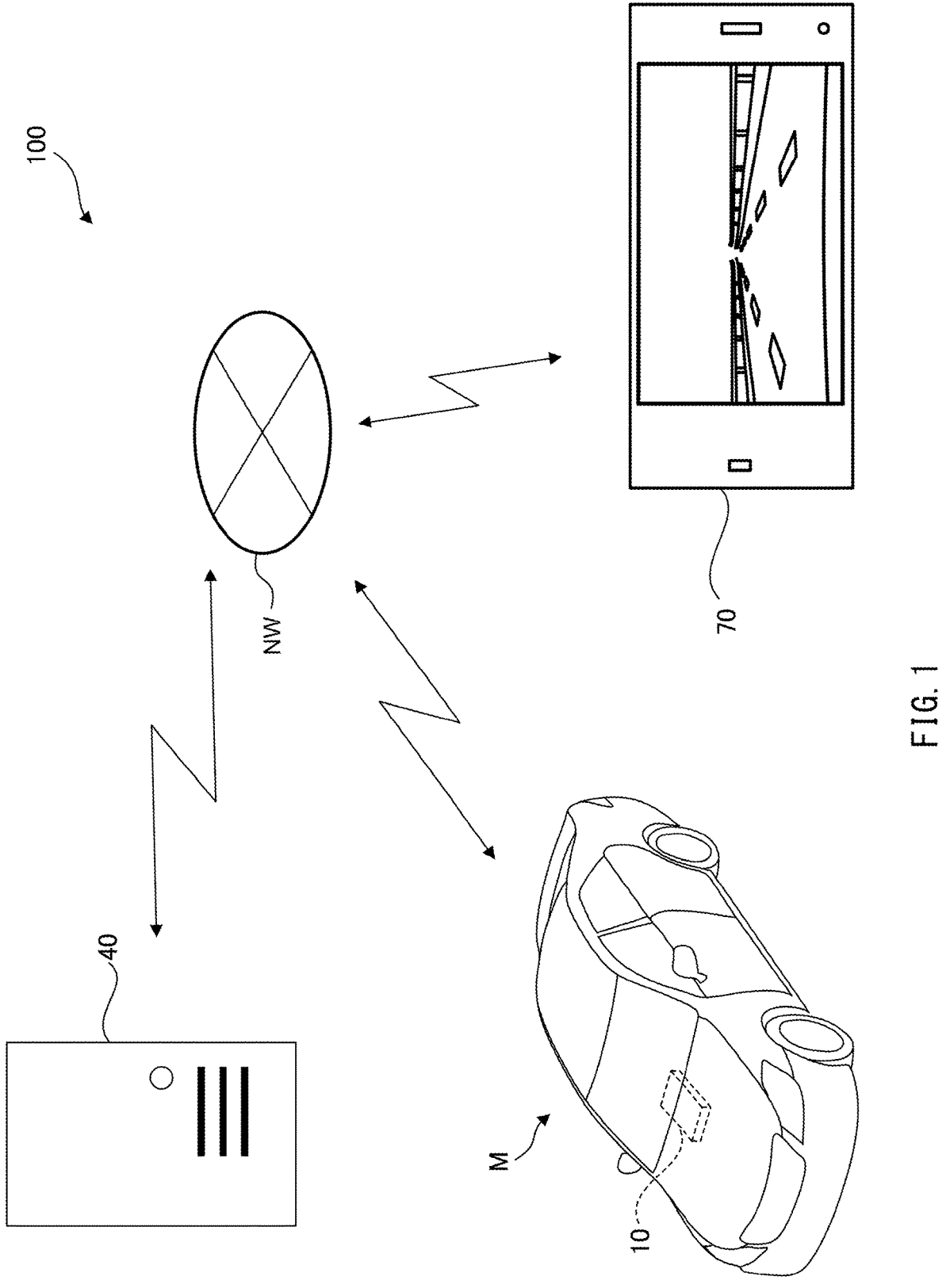
FIG. 1 is a diagram of a virtual ride-along communication system as Embodiment 1 of the present invention.

FIG. 1 illustrates the virtual ride-along communication system 100 as Embodiment 1 of the present invention. As illustrated in FIG. 1, the virtual ride-along communication system 100 is configured including an on-vehicle device 10 as an information processing apparatus, a relay server (hereinafter, also simply referred to as a server) 40, and an external device 70. Note that FIG. 1 illustrates a case in which the on-vehicle device 10 is mounted on an automobile M as an example of a moving body. In addition, FIG. 1 illustrates a smartphone as an example of the external device 70.

The on-vehicle device 10, the relay server 40, and the external device 70 can mutually transmit and receive data by using, for example, a communication protocol, such as TCP/IP or UDP/IP, via a network NW. Note that, the network NW can be established by, for example, Internet communication including wireless communication and wired communication, such as a mobile communication network or Wi-Fi (registered trademark).

In the virtual ride-along communication system 100 of the present embodiment, a voice call via the server 40 is first established between the on-vehicle device 10 and the external device 70, and then a video or an image (hereinafter, simply referred to as an image) shot by an on-vehicle camera mounted on the automobile M is transmitted from the on-vehicle device 10 to the external device 70 via the server 40. Such communication mode in which a voice call is established between the on-vehicle device 10 and the external device 70 while a video shot by the on-vehicle camera mounted on the automobile M is transmitted from the on-vehicle device 10 to the external device 70 is referred to as a voice video communication or a virtual ride-along communication.

By such a virtual ride-along communication being performed, a user of the external device 70, who is performing a voice call while watching the video transmitted from the on-vehicle device 10, can obtain a feeling as if he/she were riding along with the driver of the automobile M. In other words, the virtual ride-along communication allows the user of the external device 70 to realize a virtual ride-along in the automobile M.

The embodiment in the following describes an example of a case in which the on-vehicle device 10 is a car navigation device that receives a destination to which a user desires to be guided from the user and generates a route to the destination.

Figure 2:
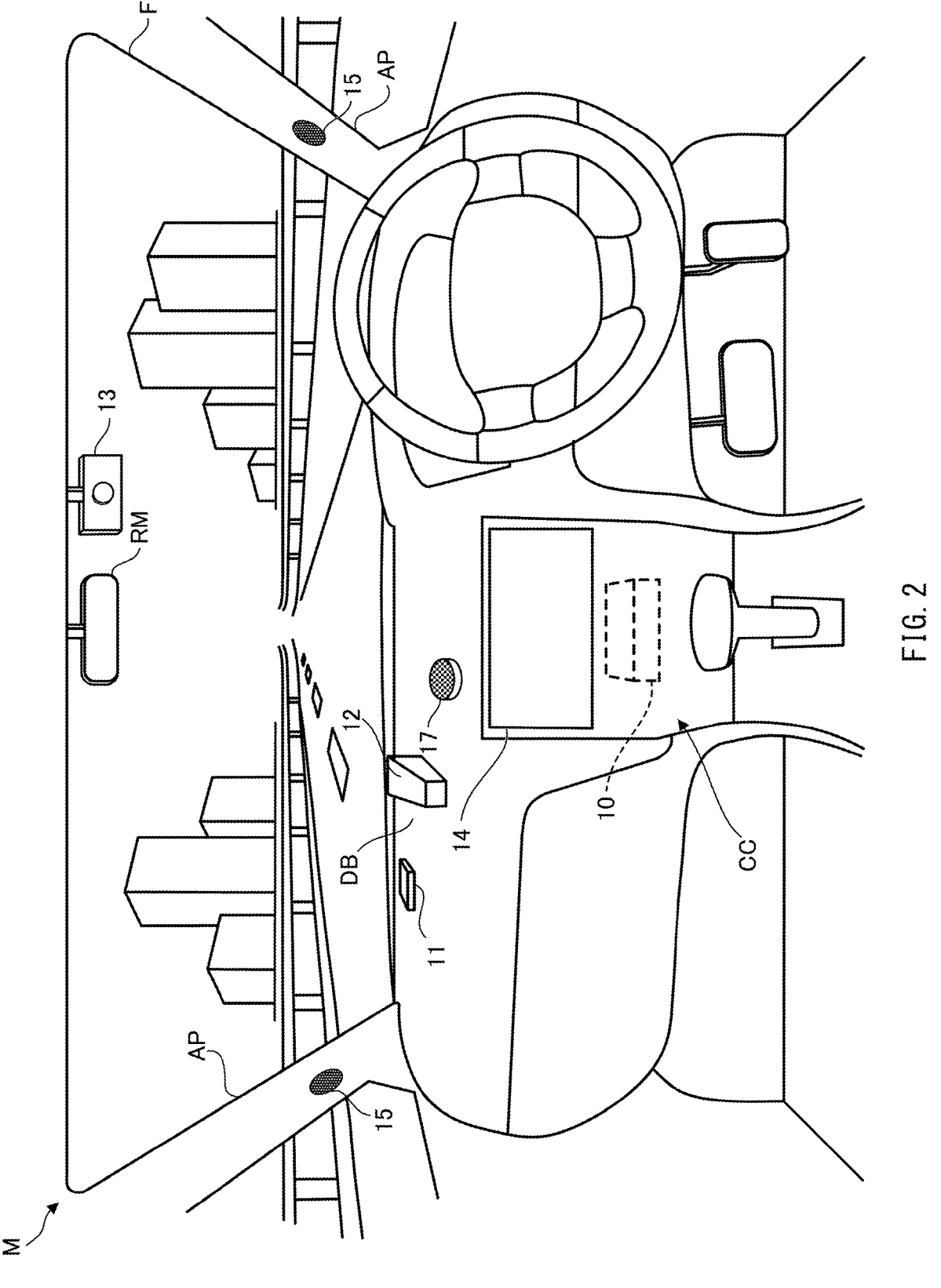
FIG. 2 is a perspective view of a front seat portion of a vehicle on which an on-vehicle device is mounted.

FIG. 2 is a perspective view illustrating the vicinity of the front seat of the automobile M on which the on-vehicle device 10 as the information processing apparatus is mounted. In FIG. 2, a case in which the on-vehicle device 10 is attached inside a dashboard DB of the front seat of the automobile M is illustrated as an attachment example.

A GPS receiver 11 is a device that receives a signal (GPS signal) from the Global Positioning System (GPS) satellite. The GPS receiver 11 is, for example, disposed on the dashboard DB. Note that the GPS receiver 11 may be disposed at any place where the GPS signal can be received. The GPS receiver 11 can transmit the received GPS signal to the on-vehicle device 10.

An outside camera 12 as an image capturing unit is an image capturing device that shoots the front of the automobile M. In the present embodiment, the outside camera 12 is disposed on the dashboard DB such that the front becomes the shooting direction. For example, the outside camera 12 is a wide-angle camera that can shoot a wide region in front of the automobile M via the windshield. At the time of the virtual ride-along communication, a video shot by the outside camera 12 is delivered to the external device 70. Note that the outside camera 12 can be disposed at any place where the front of the vehicle can be shot, such as on the back of a rear view mirror RM.

An inside camera 13 is an image capturing device that shoots the situation inside the automobile M. In the present embodiment, the inside camera 13 is provided on an upper end of a windshield FG or a ceiling portion near the upper end, and can shoot the driver of the automobile M.

A touch panel 14 is, for example, a touch panel monitor in which a display, such as a liquid crystal display, that can display a video, and a touchpad are combined. The touch panel 14 is disposed, for example, on a center console CC of the dashboard DB. The touch panel 14 may be disposed at any place that can be visually perceived by the driver and is also reachable by a hand of the driver. For example, the touch panel 14 may be attached on the dashboard DB.

The touch panel 14 can perform a screen display based on the control of the on-vehicle device 10. In addition, the touch panel 14 can transmit a signal representing an input operation to the touch panel 14 received from the user to the on-vehicle device 10. For example, the touch panel 14 may perform a guide display of a car navigation system. In addition, an operation related to a car navigation function, such as setting a destination, may be allowed via the touch panel 14.

In addition, the touch panel 14 may display information related to the virtual ride-along communication, or display a reception screen of an operation for performing a connection of the virtual ride-along communication. The passenger of the automobile M can perform the connection operation of the virtual ride-along communication by the input operation to the touch panel 14.

Speakers 15 are disposed, for example, on the indoor side of A pillars AP. The speakers 15 can emit a sound, such as music or a voice, based on the control of the on-vehicle device 10. At the time of the virtual ride-along communication, a voice from the external device 70 in the voice call is emitted from the speakers 15.

A microphone 17 is a microphone device that receives a sound inside the vehicle, and is disposed, for example, on the dashboard DB. The microphone 17 may be provided at any place where the sound inside the vehicle can be received, such as on the rear view mirror RM or a steering wheel. At the time of the virtual ride-along communication, the voice picked up by the microphone 17 is transmitted to the external device 70 as the voice of the voice call.

Figure 3:
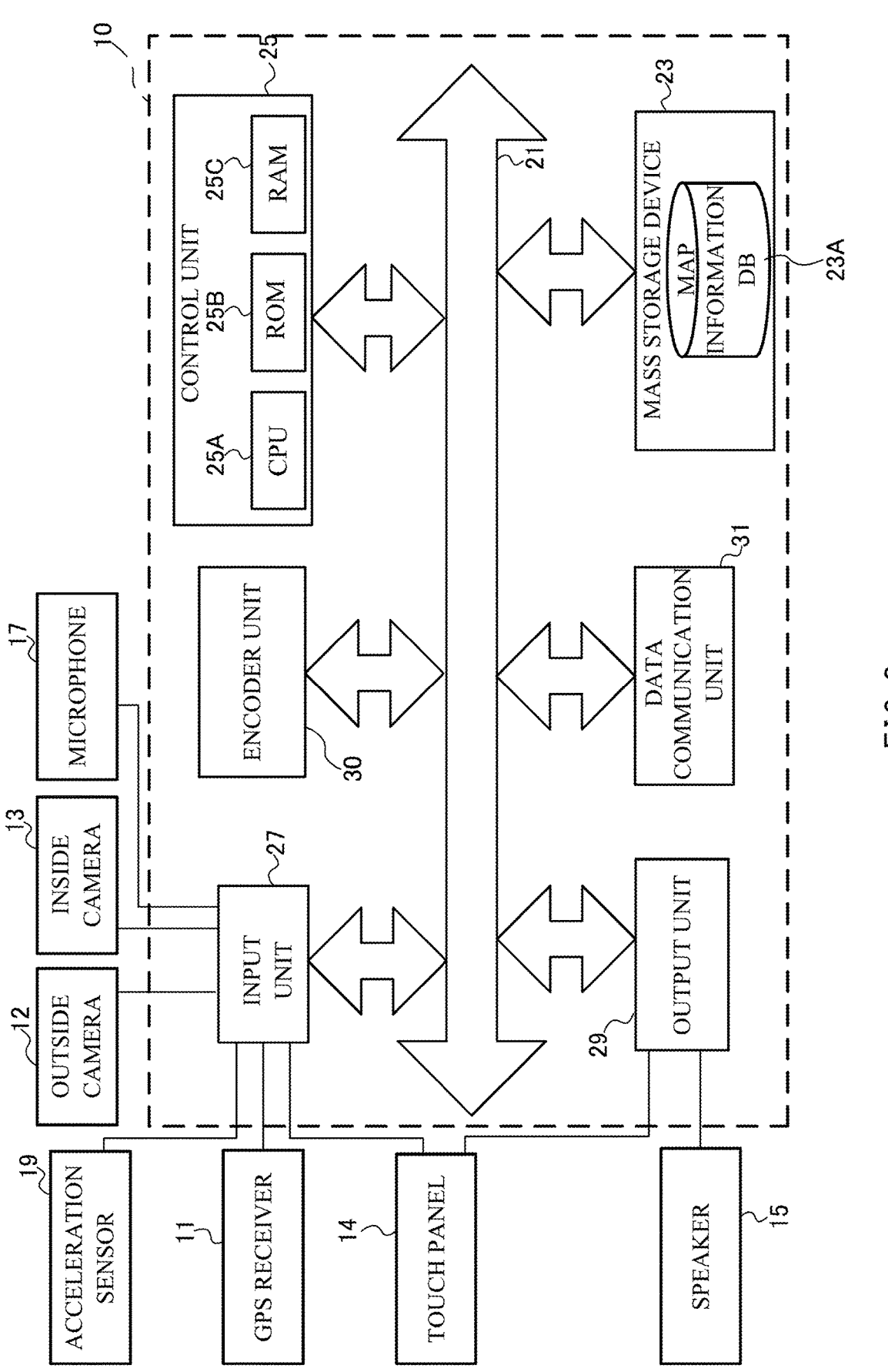
FIG. 3 is a block diagram illustrating an example of a configuration of the on-vehicle device.

FIG. 3 is a block diagram illustrating a configuration of the on-vehicle device 10. For example, the on-vehicle device 10 is a device in which a mass storage device 23, a control unit 25, an input unit 27, an output unit 29, an encoder unit 30, and a data communication unit 31 cooperate via a system bus 21.

Note that, the following description will be given assuming that an acceleration sensor 19 is mounted on the automobile M. The acceleration sensor 19 may be, for example, a MEMS acceleration sensor that can measure the acceleration of the automobile M and can output a signal indicating the measured acceleration. Note that the acceleration sensor 19 may be an Inertial Measurement Unit (IMU). Also, the acceleration sensor 19 may be built in the on-vehicle device 10.

The mass storage device 23 is constituted of, for example, a hard disk device, a solid state drive (SSD), and a flash memory, and stores an operating system and various programs, such as software for a terminal. In addition, the mass storage device 23 holds a map information database 23A including map information including a road map.

The various programs may, for example, be obtained from another server device or the like via a network, or be recorded in a recording medium and be read in via various drive devices. That is, the various programs stored in the mass storage device 23 (including an information processing program for executing a process in the on-vehicle device 10 described later) can be transmitted via a network, or be recorded in a recording medium that is readable by a computer and be transferred.

The control unit 25 is constituted of a Central Processing Unit (CPU) 25A, a Read Only Memory (ROM) 25B, a Random Access Memory (RAM) 25C, and the like, and functions as a computer. The CPU 25A reads out and executes the various programs stored in the ROM 25B or the mass storage device 23, and thereby realizes various functions. In the present embodiment, the control unit 25 allows the video voice communication function at the time of the virtual ride-along communication, the car navigation function, and the like to be provided.

The control unit 25 receives an input of a destination from the passenger via the touch panel 14 or the microphone 17, and can generate route information or navigation information to the destination, and a car navigation screen based on the information. In addition, even when the input of the destination from the passenger has not been received, the control unit 25 may generate route information by referring to a past travel history and estimating the route that the vehicle is planning to travel or the destination. Here, the route information can be understood as information related to the planned travel route of the vehicle M.

In addition, the control unit 25 can generate a composite image in which a camera image shot by the outside camera 12 or the inside camera 13 and other information, such as the above-described car navigation screen, are combined. In other words, the control unit 25 can generate a video made by performing a certain process on an outside image, that is an image based on the outside image. Furthermore, in other words, the control unit 25 can generate a superimposed image in which the car navigation screen, an image indicating the current location, an image indicating the above-described route, and the like are superimposed on the above-described camera image.

The other information may include, for example, map image information in which a mark indicating the current location of the automobile M is superimposed on a map image, such as the above-described car navigation screen, or a route image in which an image indicating the route to the destination set in the automobile M is added to the map image information. The map image information or route image information can be understood as image information generated based on current location information and allows identifying the location of the automobile M. In other words, the composite image including the map image information or the route image information can be understood to include the current location information as location identification information for identifying the current location of the automobile M.

In addition, the other information may include identification information, such as the name of the driver of the automobile M or an automobile registration number of the automobile M, information indicating the travel state, such as the speed or the acceleration of the automobile M, or information indicating the operation state of the driver of the automobile M, such as a turning angle (steering angle) of the steering wheel, a stepped amount of the accelerator or the brake, or an operation state of the blinker of the automobile M.

In addition, the control unit 25 can generate a composite image including both of an image shot by the outside camera 12 and an image shot by the inside camera 13 (hereinafter, also referred to as shot images). For example, the control unit 25 can generate an image in which a small image (hereinafter, also referred to as an inside image) shot by the inside camera 13 is included in the lower right of an image (hereinafter, also referred to as an outside image) shot by the outside camera 12, or an image that appears to be opposite thereof as a composite image. In addition, for example, a composite image of which half is the outside image and the remaining half is the inside image can be generated. Needless to say, the control unit 25 can also transmit these to the external device 70.

The input unit 27 is an interface unit that communicatively connects the control unit 25 of the on-vehicle device 10, the outside camera 12, the inside camera 13, the touch panel 14, the microphone 17, and the acceleration sensor 19. The on-vehicle device 10 can sequentially acquire the images shot by the outside camera 12 via the input unit 27. In other words, the control unit 25 functions as an acquisition unit that sequentially acquires video data indicating a video of the surroundings of the automobile shot by the outside camera 12 via the input unit 27.

The control unit 25 can sequentially acquire measurement signals of the acceleration from the acceleration sensor 19 via the input unit 27. Based on the measurement signal of the acceleration, the control unit 25 can calculate the acceleration and the speed of the automobile M.

The on-vehicle device 10 can receive a signal indicating an input operation to the touch panel 14 via the input unit 27. For example, the on-vehicle device 10 can receive a connection request for the virtual ride-along communication made from the user by the touch panel 14 and the microphone 17, or a setting input of the destination of the car navigation system via the input unit 27.

In addition, the input unit 27 is an interface unit that communicatively connects the on-vehicle device 10 and the GPS receiver 11. The on-vehicle device 10 receives a GPS signal from the GPS receiver 11 via the input unit 27, and based on the GPS signal, is able to acquire information on the current location of the on-vehicle device 10, that is, in the present embodiment, the current location of the automobile M.

In other words, the control unit 25 functions as an acquisition unit that acquires the current location information for identifying the current location of the automobile M based on the GPS signal from the GPS receiver 11. Note that, the current location information may be acquired by using an autonomous navigation method in addition to or instead of being acquired based on the GPS signal.

The output unit 29 is communicatively connected to the touch panel 14 and the speakers 15, and can transmit a video or image signal to the touch panel 14 to be displayed, or transmit an audio signal to the speakers 15 to output a sound.

The encoder unit 30 is a portion that performs encoding (hereinafter, also referred to as an encoding process) of a shot image shot by the outside camera 12 or the inside camera 13 or the above-described composite image, based on an instruction from the control unit 25. The encoder unit may include a CPU for video encoding, that is a GPU, and the encoding may be performed by the GPU.

For example, the encoder unit 30 encodes the shot image or the composite image by an encoding method of MPEG-4 standard, and generate encoded data as video encoded data. For example, the encoder unit 30 uses a codec, such as H.264, Xvid, DivX, VP8, and VP9, and generates encoded data from the shot image or the composite image. Hereinafter, this encoded data will also be simply referred to as image data.

The data communication unit 31 is connected to the above-described network NW, and transmits and receives various data with the server 40. In addition, the data communication unit 31 transmits and receives various data with the external device 70 via the server 40.

For example, the control unit 25 of the on-vehicle device 10 can transmit location identification information as location data that allows identifying the current location of the on-vehicle device 10, that is, information on the current location of the automobile M to the server 40 via the data communication unit 31.

The control unit 25 can transmit the voice picked up by the microphone 17, such as the voice data of the voice emitted by the passenger, to the external device 70 for the voice call in the virtual ride-along communication via the data communication unit 31. In addition, the control unit 25 can receive the voice data of the voice input to the external device 70 for the voice call in the virtual ride-along communication via the data communication unit 31. This transmission and reception of voice data is performed in real time while the automobile M is moving or traveling.

In addition, the control unit 25 transmits image data to the external device 70 via the data communication unit 31. The control unit 25 may transmit the image data to the external device 70 via the data communication unit 31 while buffering the image data.

The control unit 25 transmits the image data after the shot image has been shot without delay via the data communication unit 31. In other words, the control unit 25 transmits the image data including the shot image instantly in real time after the shot image has been shot and a necessary process has been performed. Furthermore, in other words, the control unit 25 transmits the image data such that the shot image can be watched in real time on the external device 70.

In addition, the control unit 25 can acquire an outside image or an inside image shot while the automobile M is moving or traveling, and transmit image data of the outside image or the inside image in real time while the automobile M is moving or traveling via the data communication unit 31.

"While the automobile M is moving (or traveling)" as described above refers to, for example, a period during which the automobile M is traveling on the way from a departure point to a destination including a brief stop. For example, "while moving (or traveling)" may be a period from when an ACC power source of the automobile M is turned on to when the ACC power source of the automobile M is turned off.

Figure 4:
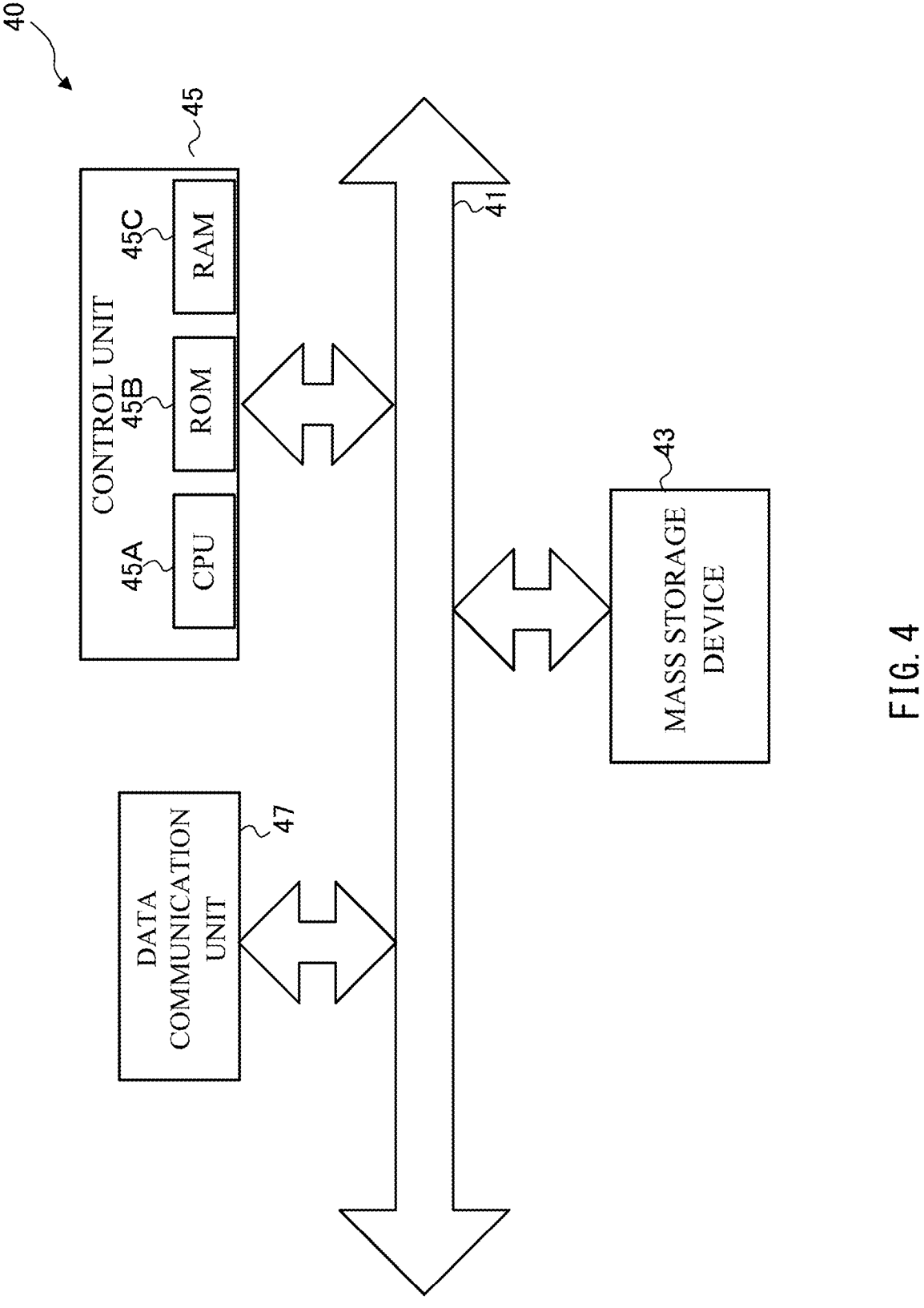
FIG. 4 is a block diagram illustrating an example of a configuration of a server.

FIG. 4 is a block diagram illustrating a configuration of the server 40. For example, the server 40 is a device in which a mass storage device 43, a control unit 45, and a data communication unit 47 cooperate via a system bus 41. The server 40 has a function like an SIP server of establishing a voice call between the on-vehicle device 10 and the external device 70 and transferring data of the voice call during the virtual ride-along communication.

In addition, the server 40 has a function of transferring shot image data transmitted from the on-vehicle device 10 to the external device 70, or processing the shot image data and transmitting it to the external device 70.

The mass storage device 43 is configured of, for example, a hard disk device and a solid state drive (SSD), and stores an operating system and various programs, such as software for the server 40.

The control unit 45 is constituted of a Central Processing Unit (CPU) 45A, a Read Only Memory (ROM) 45B, a Random Access Memory (RAM) 45C, and the like, and functions as a computer. The CPU 45A reads out and executes various programs stored in the ROM 45B or the mass storage device 43, and thereby realizes various functions.

The data communication unit 47 is connected to the above-described network NW, and transmits and receives various data with the on-vehicle device 10 and with the external device 70.

The control unit 45 transfers image data including a shot image, the current location information, the route information, and the voice information received from the on-vehicle device 10 to the external device 70 via the data communication unit 47. The control unit 45 transfers the voice received from the external device 70 to the on-vehicle device 10 via the data communication unit 47. In addition, the control unit 45 may generate a superimposed image in which an image indicating the current location generated based on the current location information received from the on-vehicle device 10 and an image indicating a route generated based on the route information are superimposed on (combined with) the shot image data received from the on-vehicle device 10, and transmit the superimposed image to the external device 70.

Figure 5:
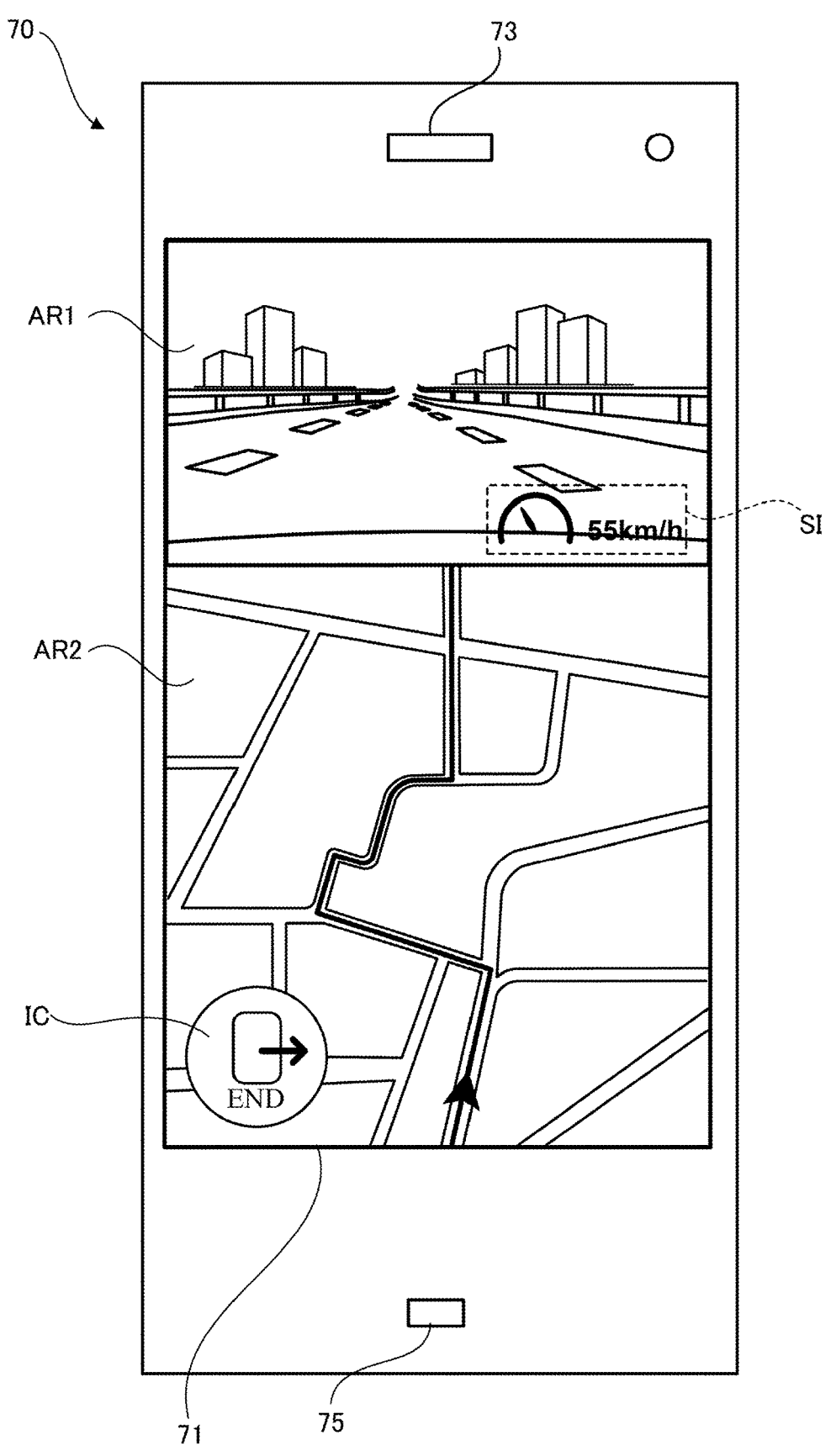
FIG. 5 is a front view of an external device.

FIG. 5 is a front view illustrating an exterior of the external device 70. As described above, in Embodiment 1, the external device 70 is a smartphone. In FIG. 5, a composite image in which the above-described outside image and the car navigation screen are combined is displayed by the external device 70. The example illustrated in FIG. 5 is an example of a vertical screen display in which the longitudinal direction of a touch panel 71 is the up-down direction.

The touch panel 71 is, for example, a touch panel monitor in which a display, such as a liquid crystal display, that can display a video and a touchpad are combined. The touch panel 71 can generate a signal representing an input operation to the touch panel 71 received from the user.

In the present embodiment, the touch panel 71 displays an image transmitted from the on-vehicle device 10, speed information SI of the automobile M, an end icon IC as an icon to be touched when causing the virtual ride-along communication to end, and the like. In the example of FIG. 5, the outside image is displayed in a region AR1 on an upper side of the touch panel 71, and the car navigation screen is displayed in a region AR2 on a lower side of the touch panel 71. In addition, the speed information SI of the automobile M is displayed in the lower right of the region AR1 viewed from the user. In addition, the end icon IC is displayed in the lower left of the region AR2 viewed from the user. This is for providing the user of the external device 70 a feeling as if riding along on the front passenger seat of the automobile M, namely, a ride-along feeling as much as possible in the virtual ride-along communication. That is, in a case in which the automobile M is assumed to be a right-hand drive Japanese vehicle (vehicle manufactured in Japan), the speed information SI of the automobile M is displayed on the right side (right side in a front traveling image) where the driver's seat is located, and an icon for ending the virtual ride-along communication is displayed on the left side (left side in the front traveling image) where a door for a fellow passenger to get off the vehicle from the passenger seat is located so as to provide the ride-along feeling as much as possible.

In addition, the touch panel 71 may display information related to the virtual ride-along communication, or display a reception screen of an operation for performing the connection of the virtual ride-along communication. The user of the external device 70 may perform the connection operation of the virtual ride-along communication by the input operation to the touch panel 71.

A speaker 73 can emit a sound, such as music or a voice. At the time of the virtual ride-along communication, the voice from the on-vehicle device 10 in the voice call is emitted from the speaker 73.

A microphone 75 is a microphone device that receives a sound emitted toward the external device 70. At the time of the virtual ride-along communication, the voice picked up by the microphone 75 is transmitted to the external device 70 as the voice of the voice call.

Figure 6:
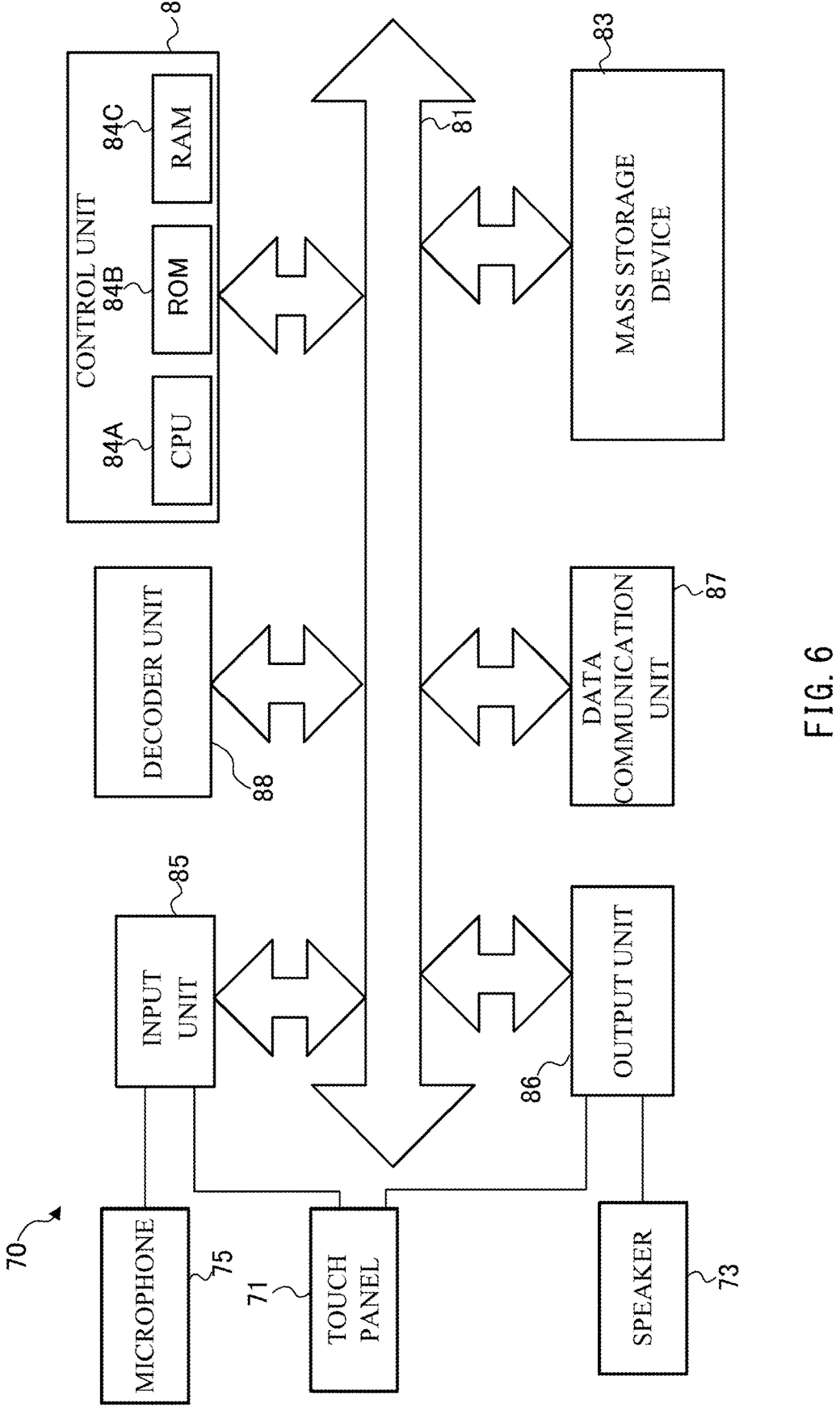
FIG. 6 is a block diagram illustrating an example of a configuration of the external device.

FIG. 6 is a block diagram illustrating a configuration of the external device 70. For example, the external device 70 is a device in which a mass storage device 83, a control unit 84, an input unit 85, an output unit 86, a data communication unit 87, a decoder unit 88 cooperate via a system bus 81.

The mass storage device 83 is constituted of, for example, a hard disk device, a solid state drive (SSD), and a flash memory, and stores an operating system and various programs, such as software for a terminal.

Note that, the various programs may, for example, be obtained from another server device or the like via a network, or be recorded in a recording medium and be read in via various drive devices. That is, the various programs stored in the mass storage device 83 (including a program for executing a process in the external device 70 described later) can be transmitted via a network, or be recorded in a recording medium that is readable by a computer and be transferred.

The control unit 84 is constituted of a Central Processing Unit (CPU) 84A, a Read Only Memory (ROM) 84B, a Random Access Memory (RAM) 84C, and the like, and functions as a computer. The CPU 84A reads out and executes various programs stored in the ROM 84B or the mass storage device 83, and thereby realizes various functions.

The input unit 85 is an input interface unit for the touch panel 71 and the microphone 75. The control unit 84 can receive a signal indicating an input operation to the touch panel 71 and a voice input signal from the microphone 75 via the input unit 85. For example, the control unit 84 can receive a connection request for the virtual ride-along communication made from the user by the touch panel 71 and the microphone 75 via the input unit 85.

The output unit 86 is an output interface unit for the touch panel 71 and the speaker 73. The control unit 84 can transmit a video or image signal to the touch panel 71 and the output unit 86 to be displayed, or transmit an audio signal to the speaker 73 to output a sound.

The data communication unit 87 is connected to the above-described network NW, and transmits and receives various data with the server 40. In addition, the data communication unit 87 transmits and receives various data starting with the image data and the current location information transmitted from the on-vehicle device 10 with the on-vehicle device 10 via the server 40. For example, the control unit 84 can receive route information on the automobile M, speed information on the automobile M, or navigation information from the on-vehicle device 10 via the data communication unit 87.

In addition, the control unit 84 can transmit voice data of the voice picked up by the microphone 75 for the voice call in the virtual ride-along communication to the on-vehicle device 10 via the data communication unit 87. In addition, the control unit 84 can receive voice data transmitted from the on-vehicle device 10 for the voice call in the virtual ride-along communication via the data communication unit 87.

The decoder unit 88 is a portion that decodes, plays, and outputs the image data received from the on-vehicle device 10 based on an instruction from the control unit 84. The decoder unit 88 decodes the image data by the codec of when the image data was encoded, such as the encoding method of MPEG-4 standard, and plays and outputs the video. The played image is displayed on the touch panel 71 by the control unit 84.

[2. Operation Sequence of System When Performing Virtual Ride-along Communication]

Figure 7:
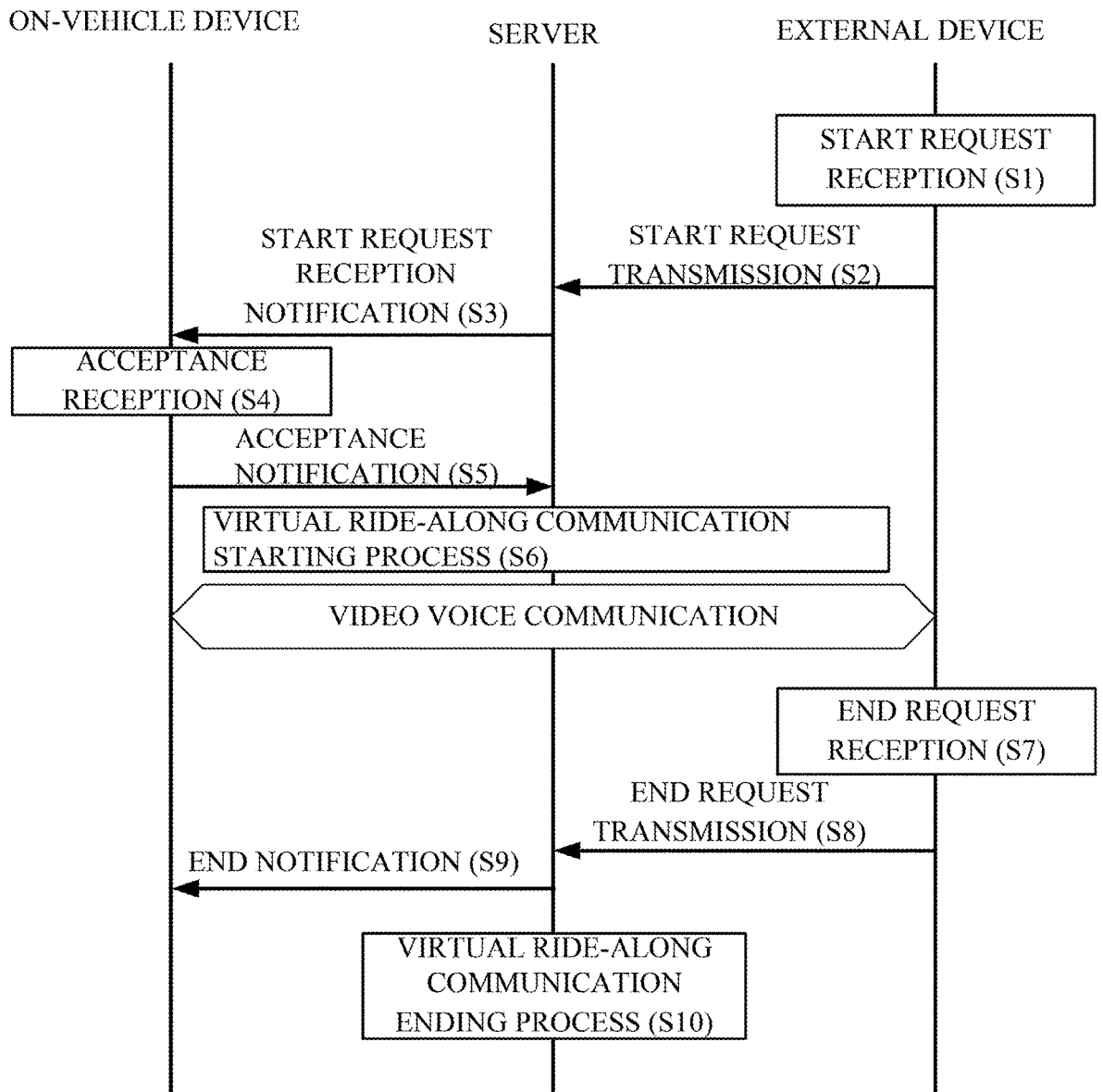
FIG. 7 is a sequence diagram of the virtual ride-along communication system at the time of a virtual ride-along communication.

Hereinafter, the operation of the virtual ride-along communication system 100 in Embodiment 1 when the virtual ride-along communication is performed will be described using FIG. 7. FIG. 7 is a diagram illustrating a process sequence of the virtual ride-along communication system 100 at the time of the virtual ride-along communication. Here, a case in which a request for starting the virtual ride-along communication is made from the external device 70, and a request for ending the virtual ride-along is made from the external device 70 will be described as an example.

First, the external device 70 receives a start request for the virtual ride-along communication from the user (Step S1). This reception of the start request is performed by, for example, receiving an operation of the user on the touch panel 71 of the external device 70 or a voice input operation via the microphone 75. After receiving the request, the external device 70 transmits the start request for the virtual ride-along communication to the server 40 (Step S2).

After receiving the start request from the external device 70, the server 40 transmits a start request reception notification indicating the fact that a request for the virtual ride-along communication has been made to the on-vehicle device 10 (Step S3). After receiving the start request reception notification, the on-vehicle device 10 informs the passenger of the automobile M of the fact, for example, via the touch panel 14 or the speakers 15.

After receiving the start request reception notification and informing the passenger of the fact, the on-vehicle device 10 receives an acceptance of starting the virtual ride-along communication from the passenger, such as the driver, of the automobile M (Step S4). This reception of acceptance is performed by, for example, receiving an operation of the passenger on the touch panel 14 of the on-vehicle device 10, or by receiving a voice input operation by the passenger via the microphone 17. After receiving the acceptance of starting the virtual ride-along communication, the on-vehicle device 10 transmits an acceptance notification to the server 40 (Step S5).

After receiving the acceptance notification, the server 40 executes the process of starting the virtual ride-along communication including establishing a voice call communication between the on-vehicle device 10 and the external device 70, establishing a video communication of transferring an image transmitted from the on-vehicle device to the external device, and starting the transfer of the current location information transmitted from the on-vehicle device 10 to the external device 70 (S6), and the video voice communication of the virtual ride-along communication is started. When this virtual ride-along communication starting process is completed and the video voice communication is started, the on-vehicle device 10 starts transmitting the outside image shot by the outside camera 12, the inside image, the current location information, the route information, and the like to the server 40.

Subsequently, at the end of the virtual ride-along communication, the external device 70 receives a request for ending the virtual ride-along communication from the user (Step S7). This reception of request for ending is performed by, for example, receiving an operation of the user on the touch panel 71 of the external device 70 or a voice input operation via the microphone 75. After receiving the end request, the external device 70 transmits the end request for the virtual ride-along communication to the server 40 (Step S8).

After receiving the end request from the external device 70, the server 40 transmits an end notification indicating the fact that the virtual ride-along communication is going to end to the on-vehicle device 10 (Step S9). After receiving the end notification, for example, the on-vehicle device 10 informs the passenger of the automobile M of the above-mentioned fact via the touch panel 14 or the speakers 15.

After transmitting the end notification, the server 40 executes an ending process of the virtual ride-along communication, such as disconnecting the voice call communication, and disconnecting the video delivery communication (S10), and the video voice communication of the virtual ride-along communication is ended.

[3. Operation Routine of On-Vehicle Device when Performing Virtual Ride-Along Communication]

Figure 8:
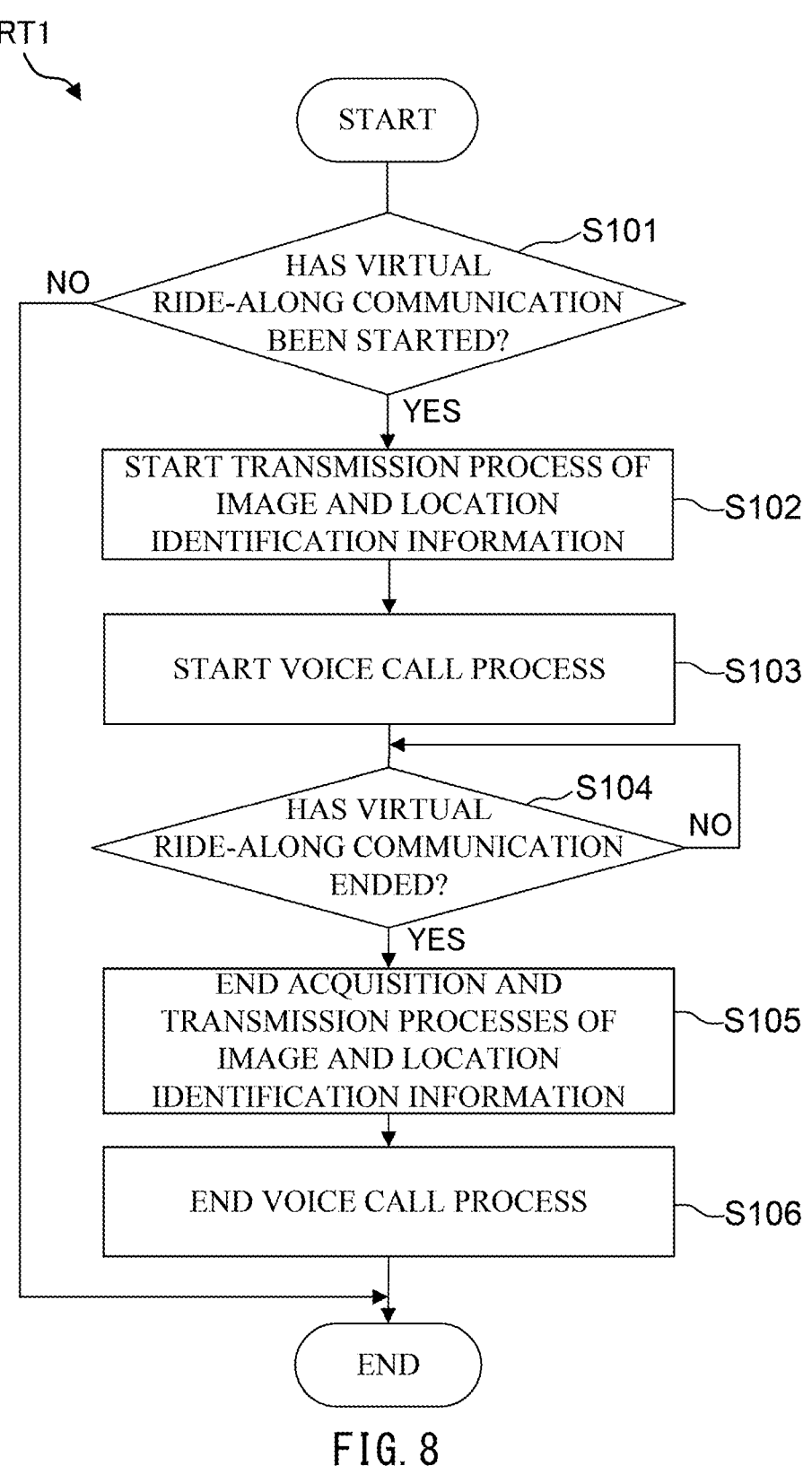
FIG. 8 is a flowchart of an operation routine of the on-vehicle device.

FIG. 8 is a flowchart illustrating a virtual ride-along communication process routine RT1 executed by the control unit 25 of the on-vehicle device 10. For example, when the power source is turned on in the on-vehicle device 10, the control unit 25 starts the virtual ride-along communication process routine RT1 and executes this repeatedly. This turning on of the power source is performed by, for example, turning on the ACC power source of the automobile M.

First, the control unit 25 determines whether or not the on-vehicle device 10 has started the virtual ride-along communication with the external device 70 (Step S101). This determination is performed, for example, based on whether or not an acceptance of the start request for the virtual ride-along communication has been received, and a communication has been established with the external device 70 in the on-vehicle device 10. When the control unit 25 determines that the virtual ride-along communication has not been started (Step S101: NO), the control unit 25 ends the routine RT1.

When the control unit 25 determines that the virtual ride-along communication has been started (Step S101: YES), the control unit 25 acquires an outside image, which is an image of the outside of the automobile M, from the outside camera 12, and also acquires the current location information indicating the location of the automobile M based on a GPS signal from the GPS receiver 11, and after acquiring these, the control unit 25 starts a transmission process of transmitting these in real time without delay to the external device 70 via the server 40 (Step S102).

In this transmission process, the outside image itself or a video made by performing a certain process on the outside image, that is, an image based on the outside image is transmitted. For example, in the transmission process, a composite image in which other information related to the automobile M as described above is visually perceivably superimposed on the outside image may be transmitted. In addition, in the present transmission process, a composite image, in which a navigation image is superimposed on the outside image, generated by the on-vehicle device 10 may be transmitted. The navigation image includes at least a mark indicating the current location displayed on a map image of the vicinity of the current location. In addition, when the superimposing (combining) process of the image is performed by the external device 70 or the server 40, which are the transmission destinations, in the present transmission process, the shot images (the outside image and the inside image) and other information (such as the current location information and the route information) to be superimposed on the shot images are transmitted to the external device 10 (or the server 40) from the on-vehicle device 10.

In other words, when the transmission process is started in Step S102, the control unit 25 acquires the current location information on the automobile M, and also functions as an acquisition unit that executes an acquisition process or an acquiring step of acquiring the outside image from the outside camera 12. In addition, when the transmission process is started in Step S102, the control unit 25 functions as a transmission unit that executes a transmission process or a transmitting step of transmitting the above-described acquired current location information and outside image itself or traveling image information based on the outside image to the external device 70 as a terminal device without delay after the acquisition.

Note that, when the outside image includes information that allows identifying the location of the automobile M, such as the above-described map information or map route information, that is, when the image includes the current location information, the current location information need not be transmitted separately from the image in the above-described transmission process.

After Step S102, the control unit 25 starts a voice call process of transmitting and receiving voices with the external device 70 via the server 40 (Step S103). Specifically, the control unit 25 starts a process of transmitting a voice input via the microphone 17 to the external device 70, and outputting a voice received from the external device 70 via the speakers 15.

In other words, after the voice call process is started in Step S103, the control unit 25 functions as a voice call unit that executes a voice call process or a voice call step of performing a voice call process in a voice call connection in which the passenger of the automobile M as the moving body and the user of the external device 70 as the terminal device perform a voice call simultaneously with the above-described transmission process.

When Steps S102 and S103 are executed, and the transmission process of the image and the current location information and the voice call process are started, the control unit 25 determines whether or not the virtual ride-along communication between the on-vehicle device 10 and the external device 70 has ended (Step S104). When the control unit 25 determines that the virtual ride-along communication has not ended, that is, the virtual ride-along communication is continuing (Step S104: NO), the control unit 25 repeatedly executes Step S104. That is, as long as the virtual ride-along communication does not end, the transmission process of the image and the current location information and the voice call process continue.

When the control unit 25 determines that the virtual ride-along communication with the external device 70 has ended in Step S104 (Step S104: YES), the control unit 25 ends the acquisition and transmission processes of the outside image and the current location information (Step S105), subsequently ends the voice call process (Step S106), and subsequently ends the routine R1. In other words, when the control unit 25 determines that the virtual ride-along communication with the external device 70 has ended, the control unit 25 ends the acquisition and transmission processes of the image and the current location information and the voice call process.

Thus, according to the virtual ride-along communication system 100 or the on-vehicle device 10 of the present invention, while the outside image of the automobile M is transmitted to the external device 70 in real time and a voice call can also be performed between the on-vehicle device 10 and the external device 70, the current location information that allows identifying the location of the automobile M is transmitted to the external device 70.

By allowing a voice call to be performed between the on-vehicle device 10 and the external device 70 while the outside image is transmitted in real time to the external device 70, the user of the external device 70 can have a conversation with the passenger of the automobile M while watching the same scenery with the passenger of the automobile M, and can have a virtual ride-along experience in which the user feels as if riding on the automobile M.

By further acquiring the current location information, route information, or information based on them transmitted from the on-vehicle device 10, the user of the external device 70 can be aware of where the automobile M is traveling, where the automobile M is planning to travel hereafter, and the like, which allows a satisfactory virtual ride-along experience by sharing further information related to the automobile M besides the scenery with the passenger of the automobile M.

In the virtual ride-along communication in the above-described embodiment, the outside image of the automobile M is to be transmitted in real time from the on-vehicle device 10 side. However, a camera may be mounted on the external device 70, and an image shot by the camera may also be transmitted from the external device 70 to the on-vehicle device 10. In that case, the image transmitted from the external device 70 is displayed on, for example, the touch panel 14 in the on-vehicle device 10.

In the above-described embodiment, the on-vehicle device 10 is to be an on-vehicle navigation device, but the on-vehicle device 10 need be able to simply deliver a moving image from the outside camera 12 or the inside camera 13. In addition, the on-vehicle device 10 can be a terminal in which the outside camera 12 or the inside camera 13 is built in, such as a smartphone or a tablet. In this case, the on-vehicle device 10 can be attached on the dashboard DB by a cradle, for example, such that the built-in camera can shoot the front of the automobile M through the windshield of the automobile M.

In addition, in the above-described embodiment, the on-vehicle device 10 and the external device 70 are to perform the virtual ride-along communication via the server 40, but the virtual ride-along communication may be performed directly between the on-vehicle device 10 and the external device 70. For example, the virtual ride-along communication may be performed directly between the on-vehicle device 10 and the external device 70 by a Peer to Peer (P2P) communication or the like without via the server 40.

In addition, the on-vehicle device 10 and the external device 70 need not necessarily be able to perform a voice call. For example, it may be a mode in which a video and a voice are simply delivered from the on-vehicle device 10 to the external device 70 without accompanying a bidirectional voice call, like YouTube (registered trademark) or Niconico live broadcast (registered trademark) described above.

In the above-described embodiment, a case in which the moving image delivery operation is started after the communication between the on-vehicle device 10 and the external device 70 is established in the on-vehicle device 10 has been described as an example. However, the moving image delivery may be performed in a mode like the moving image delivery of YouTube (registered trademark) or Niconico live broadcast (registered trademark) described above. That is, the moving image delivery operation may be started without the establishment of a communication with a terminal on the viewer side, such as the external device 70. Specifically, an upload of moving image data to the server 40 by the on-vehicle device 10 may be started without the establishment of a communication between the on-vehicle device 10 and the terminal on the viewer side, such as the external device 70.

For example, the moving image delivery operation by the on-vehicle device 10 may be started after the establishment of a communication between the on-vehicle device 10 and the server 40 without the establishment of a communication connection with the external device 70. In this case, by an unspecific or a permission-granted specific external device 70 connecting to the server 40, it becomes possible to receive a moving image delivered from the on-vehicle device 10 and allow the user of the external device 70 to watch the moving image.

In addition, the information processing apparatus of the present invention may have a configuration in which a terminal device having a configuration similar to that of the on-vehicle device 10 in the present embodiment, the outside camera 12 (or the outside camera 12 and the inside camera 13), and the touch panel 14 are integrated. Specifically, for example, the information processing apparatus of the present invention may be a smartphone, a tablet, a PC, or the like equipped with a camera in which an application that provides a function similar to that of the above-described on-vehicle device 10 is installed.

In addition, the on-vehicle device 10 may have a configuration without an image display unit like the touch panel 14 for the driver of the automobile M. For example, the on-vehicle device 10 may have a configuration like a drive recorder, and may be, for example, a device integrated with the outside camera 12 or the inside camera 13. Specifically, the on-vehicle device 10 may be, for example, a device in which hardware providing the above-described virtual ride-along communication function of the on-vehicle device 10 is built inside a casing of the outside camera 12. In this case, the on-vehicle device 10 need not perform the various display outputs as described above.

In the present embodiment, a case in which the outside image, which is an image of the outside of the automobile M, is transmitted from the on-vehicle device 10 to the external device 70 has been described, but it is not limited thereto. For example, an image transmitted from the on-vehicle device 10 to the external device 70 may be switchable between a video shot by the outside camera 12 of the automobile M and a video of the inside of the automobile M shot by the inside camera 13. When the video of the inside of the automobile M is being transmitted, the user of the external device 70 can, for example, communicate with the driver of the automobile M while watching the state of the inside of the automobile M.

Note that the switch operation of switching the video transmitted to the external device 70 between the video of the outside camera 12 and the video of the inside camera 13 may be performed in the on-vehicle device 10. In addition, the switch operation may be performed remotely by an operation on the external device 70 by the user of the external device 70.

In the present embodiment, in the on-vehicle device 10, the outside image or the inside image of the automobile M or a composite image generated by processing the above images and the current location information are to be transmitted to the external device 70 via the server 40.

However, in addition to the outside image, the inside image, and the current location information, the on-vehicle device 10 may transmit a map image on which a planned travel route is indicated, the name of the driver of the automobile M, a traveling speed of the automobile M, and the like to the external device 70, and the external device 70 side may generate an image in which these pieces of information transmitted from the on-vehicle device 10 are superimposed on the image of the outside of the automobile M. In other words, a composite image like the one generated by the on-vehicle device 10 in the above-described embodiment may be generated in the external device 70.

For example, the control unit 84 of the external device 70 may display the map image, the identification information, such as the name of the driver of the automobile M or the automobile registration number, and the traveling speed of the automobile M received from the on-vehicle device 10 on top of the video of the outside of the automobile M in the touch panel 71. In addition, a process of displaying the map image, the identification information, such as the name of the driver of the automobile M or the automobile registration number, and the traveling speed of the automobile M received from the on-vehicle device 10 such that they are arranged in a display region different from that of the video of the outside of the automobile M may be performed on the external device 70 side. The map image, the name of the driver of the automobile M, and the traveling speed of the automobile M may be freely switchable between display and non-display by an operator of the external device 70. Note that, similarly, it may be configured that the display or non-display of the information included in the composite image generated and transmitted by the on-vehicle device 10 is changeable by an operation from the external device 70.

In the above-described embodiment, an example in which the on-vehicle device 10 is mounted on the automobile M has been described, but the on-vehicle device 10 may be mounted on another moving body, such as a bicycle or a bike. In addition, the on-vehicle device 10 may also include a camera built in like a smartphone, and be held by a person so as to, for example, perform a virtual ride-along communication as described above and deliver a video while walking.

The configurations, routines, and the like of the on-vehicle device 10, the server 40, and the external device 70 in the above-described embodiment are merely exemplifications, and can be selected or changed as appropriate according to the usage or the like.

DESCRIPTION OF REFERENCE SIGNS

100 Virtual ride-along communication system
10 On-vehicle device

16

12 Outside camera
13 Inside camera
25, 84 Control unit
31, 87 Data communication unit
40 Relay server
70 External device

The invention claimed is:

1. An information processing apparatus comprising:
an acquisition unit that acquires current location information on a moving body and an outside image of surroundings of the moving body shot by an image capturing unit disposed in the moving body while the moving body is traveling;
a transmission unit that performs a transmission process of transmitting a traveling image to a terminal device, the traveling image including the outside image acquired by the acquisition unit and a map image based on the current location information superimposed on the outside image; and
a voice call unit that performs a voice call process in which a passenger of the moving body and a user of the terminal device perform a voice call simultaneously with the transmission process.

2. The information processing apparatus according to claim 1, wherein
the traveling image is an image in which route information to a destination of the moving body is further superimposed on the outside image.

3. The information processing apparatus according to claim 1, wherein
the acquisition unit acquires an inside image shot by the image capturing unit disposed in the moving body while the moving body is traveling, and the transmission unit transmits the inside image in addition to the traveling image to the terminal device in the transmission process.

4. An information processing apparatus comprising:
an acquisition unit that acquires current location information on a moving body, route information representing a planned travel route of the moving body, and an outside image of surroundings of the moving body shot by an image capturing unit disposed in the moving body while the moving body is traveling;
a transmission unit that performs a transmission process of transmitting the outside image acquired by the acquisition unit and a route image based on the route information acquired by the acquisition unit; and
a voice call unit that performs a voice call process in which a passenger of the moving body and a user of a terminal device perform a voice call simultaneously with the transmission process.

5. An information processing method executed by an information processing apparatus that moves together with a moving body, the information processing method comprising:
an acquiring step of acquiring current location information on the moving body and an outside image of surroundings of the moving body shot by an image capturing unit disposed in the moving body while the moving body is traveling;
a transmitting step of performing a transmission process of transmitting a traveling image to a terminal device, the traveling image including the outside image acquired by the acquiring step and a map image based on the current location information superimposed on the outside image; and a voice call step of performing a voice call process in which a passenger of the moving body and a user of the terminal device perform a voice call simultaneously with the transmission process.

6. An information processing program embodied on a non-transitory computer readable medium for causing an information processing apparatus that moves together with a moving body to execute:

an acquiring step of acquiring current location information on the moving body and an outside image of surroundings of the moving body shot by an image capturing unit disposed in the moving body while the moving body is traveling;

a transmitting step of performing a transmission process of transmitting a traveling image to a terminal device, the traveling image including the outside image acquired by the acquiring step and a map image based on the current location information superimposed on the outside image; and a voice call step of performing a voice call process in which a passenger of the moving body and a user of the terminal device perform a voice call simultaneously with the transmission process.

7. A non-transitory computer-readable storage medium that stores an information processing program for causing an information processing apparatus that moves together with a moving body to execute:

an acquiring step of acquiring current location information on the moving body and an outside image of surroundings of the moving body shot by an image capturing unit disposed in the moving body while the moving body is traveling;

a transmitting step of performing a transmission process of transmitting a traveling image to a terminal device, the traveling image including the outside image acquired by the acquiring step and a map image based on the current location information superimposed on the outside image; and a voice call step of performing a voice call process in which a passenger of the moving body and a user of the terminal device perform a voice call simultaneously with the transmission process.

* * * * *